(12) United States Patent
Jay et al.

(10) Patent No.: US 10,246,024 B2
(45) Date of Patent: Apr. 2, 2019

(54) STORAGE CONTAINER FOR A TRACTOR TRAILER

(71) Applicants: Dean Jay, Ucon, ID (US); Jordon Jay, Ucon, ID (US)

(72) Inventors: Dean Jay, Ucon, ID (US); Jordon Jay, Ucon, ID (US)

(*) Notice: Subject to any disclaimer, the term of this patent is extended or adjusted under 35 U.S.C. 154(b) by 136 days.

(21) Appl. No.: 15/237,460

(22) Filed: Aug. 15, 2016

(65) Prior Publication Data
US 2017/0043727 A1 Feb. 16, 2017

Related U.S. Application Data

(60) Provisional application No. 62/205,304, filed on Aug. 14, 2015.

(51) Int. Cl.
*B60R 9/00* (2006.01)
*B60R 9/06* (2006.01)

(52) U.S. Cl.
CPC ............... *B60R 9/00* (2013.01); *B60R 9/065* (2013.01)

(58) Field of Classification Search
CPC .................................. B60R 9/00; B60R 9/065
USPC ...... 296/37.6, 37.14, 39.2, 184.1, 37.1, 57.1
See application file for complete search history.

(56) References Cited

U.S. PATENT DOCUMENTS

| | | | |
|---|---|---|---|
| 4,732,420 A * | 3/1988 | O'Neil | B60R 11/06 105/347 |
| 4,733,898 A | 3/1988 | Williams | |
| 4,948,169 A * | 8/1990 | Amundson | B60R 9/02 182/88 |
| 5,125,710 A * | 6/1992 | Gianelo | B60R 9/02 224/281 |
| 5,310,303 A * | 5/1994 | Betts | B62D 27/06 224/538 |
| 6,443,476 B1 * | 9/2002 | Molock, Jr. | B60D 1/60 150/166 |
| 6,722,728 B2 | 4/2004 | Borugian | |
| 6,830,281 B2 | 12/2004 | Hoffman | |
| 7,097,224 B2 | 8/2006 | Lester et al. | |
| 7,290,820 B1 | 11/2007 | Smith et al. | |
| 7,631,919 B2 | 12/2009 | Schrader | |
| 7,926,831 B2 * | 4/2011 | Blair | B62D 49/005 280/418.1 |
| 8,122,989 B2 * | 2/2012 | Burchett | B60R 16/04 180/68.5 |
| 9,346,491 B1 * | 5/2016 | Wurzer | B62D 21/09 |

(Continued)

*Primary Examiner* — Jason S Morrow
*Assistant Examiner* — E Turner Hicks
(74) *Attorney, Agent, or Firm* — Schmeiser, Olsen & Watts, LLP

(57) ABSTRACT

A storage container for a tractor trailer. The storage container includes two side walls positioned parallel to two frame rails on the tractor trailer. Two end walls are coupled to the two side walls. A bottom plate is coupled adjacent the tractor trailer. A cover plate is hingedly coupled adjacent the tractor trailer. The storage container opens parallel to the two frame rails. A method for using a storage container includes remotely activating an actuator coupled to a cover plate, wherein the actuator causes the cover plate to rotate in an arc parallel to a frame rail on the tractor trailer from a closed to an open position; adding or removing items from a storage area; remotely activating the actuator, wherein the actuator causes the cover plate to close; and remotely locking the storage container.

17 Claims, 12 Drawing Sheets

(56) References Cited

U.S. PATENT DOCUMENTS

| | | | |
|---|---|---|---|
| 9,457,726 B1 * | 10/2016 | Hill | B60R 9/00 |
| 2005/0140159 A1 * | 6/2005 | Barber | B60P 3/14 296/37.6 |

* cited by examiner

STORAGE CONTAINER FOR A TRACTOR TRAILER

CROSS REFERENCE TO RELATED APPLICATION

This application claims priority to U.S. Patent Application Ser. No. 62/205,304 to Dean Jay, et al. entitled "STORAGE CONTAINER FOR A TRACTOR TRAILER", filed Aug. 14, 2015, the disclosure of which is hereby incorporated entirely herein by reference.

BACKGROUND OF THE INVENTION

Technical Field

This invention relates to a storage container for a tractor trailer and particularly to a disguised storage container for a tractor trailer.

State of the Art

Tractor trailers are driven all over North America and other parts of the world. A tractor trailer consists of a powered truck or tractor with a detachable trailer. Tractor trailers are used to move all types of goods from place to place.

While there is limited space within the tractor itself for a driver to store personal belongings, tools and the like, there are locations on the outside of the tractor trailer in which storage containers may be placed. Many of these locations, however, are not easily accessible when a trailer is coupled to the tractor.

Drivers of tractor trailers drive their vehicles thousands of miles. Drivers often stop at truck stops or other locations in order to eat or rest. When a tractor trailer is stopped, storage compartments on the outside of the vehicle may be vulnerable to theft. Therefore, it is desirable to have hidden storage that is not obvious to individuals who may want to steal from the tractor trailer.

While, U.S. Pat. No. 4,733,898 to Williams; U.S. Pat. No. 7,097,224 to Lester et al.; U.S. Pat. No. 7,290,820 to Smith et al.; and U.S. Pat. No. 7,631,919 to Schrader describe storage compartments located below the surface of the bed or bed liner of a pickup truck, they do not describe storage compartments on tractor trailers. Additionally, U.S. Pat. No. 5,125,710 to Gianelo and U.S. Pat. No. 4,948,169 to Amundson describe a storage compartment underneath the bed of a truck or trailer.

Accordingly, what is needed is a storage container for a tractor trailer that is both hidden and easily accessible when carrying a load.

DISCLOSURE OF THE INVENTION

The disclosed invention relates to a storage container for a tractor trailer. The storage container is hidden from view. The hidden storage container may be located between the frame rails on either the tractor or the trailer.

An embodiment of a storage container for use in combination with a tractor trailer includes at least two side walls positioned parallel to at least two frame rails of the tractor trailer, and at least two end walls coupled to the at least two side walls. The at least two end walls are oriented perpendicular to the at least two side walls. A bottom plate is coupled adjacent the tractor trailer. A cover plate is hingedly coupled adjacent the tractor trailer. The storage container is located behind a cab of the tractor trailer and opens parallel to the at least two frame rails.

An additional embodiment of a storage container for use in combination with a tractor trailer includes at least two end walls which are oriented perpendicular to at least two frame rails of a tractor of the tractor trailer. A bottom plate is coupled to the at least two end walls, wherein the bottom plate is perpendicular to the at least two end walls. A cover plate is hingedly coupled parallel to the bottom plate, wherein the cover plate is positioned flush with a top of the at least two frame rails. The storage container is positioned between the at least two frame rails. The cover plate opens upward.

A method for using a storage container in combination with a tractor trailer includes remotely activating an actuator coupled to a cover plate, wherein the actuator causes the cover plate to rotate in an arc parallel to at least one frame rail on the tractor trailer from a closed position to an open position; adding or removing items from a storage area accessible when the cover plate is in the open position; remotely activating the actuator, wherein the actuator causes the cover plate to rotate from the open position to the closed position; and remotely locking the storage container.

The foregoing and other features and advantages of the invention will be apparent to those of ordinary skill in the art from the following more particular description of the invention and the accompanying drawings.

BRIEF DESCRIPTION OF THE DRAWINGS

The invention will hereinafter be described in conjunction with the appended drawings and photos where like designations denote like elements, and.

DETAILED DESCRIPTION OF EMBODIMENTS OF THE INVENTION

Figure 1:
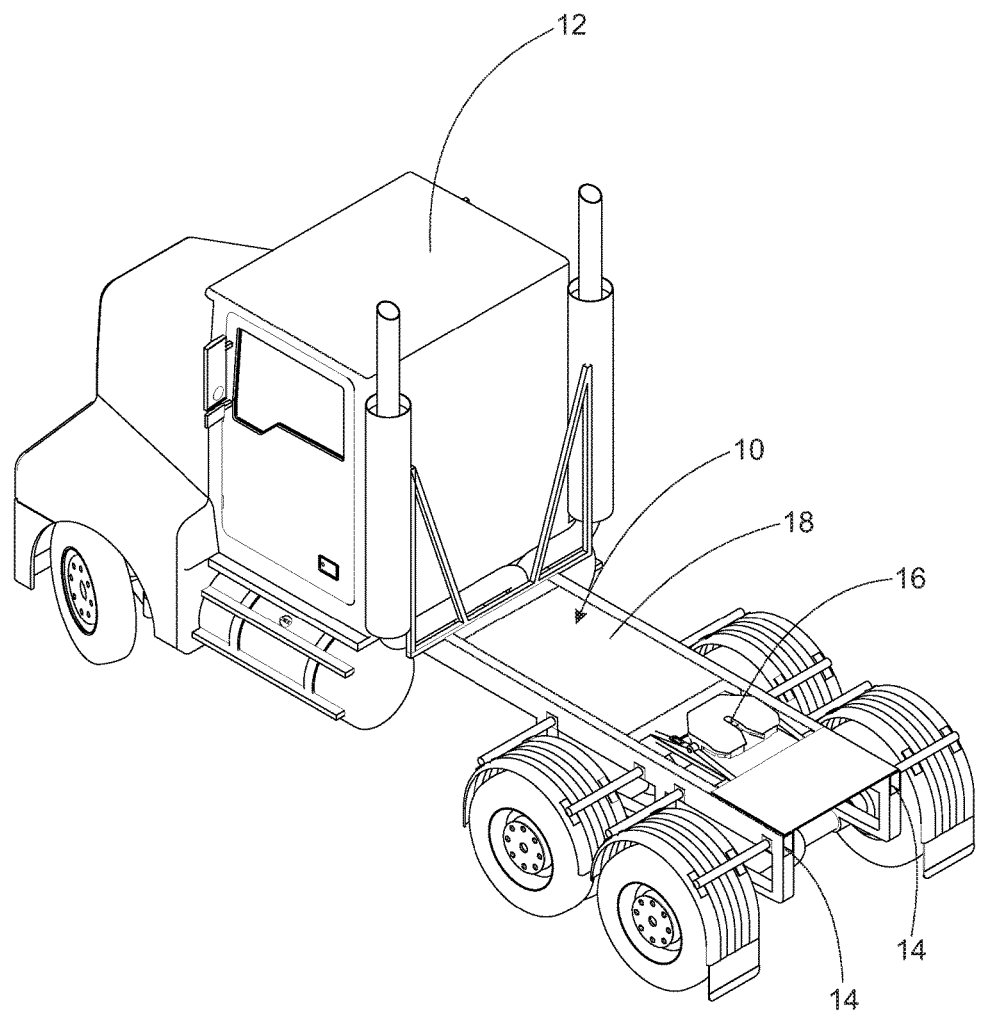
FIG. 1 shows an isometric view of a tractor having a storage container in a closed position.

As discussed above, embodiments of the present invention relate to a storage container for a tractor trailer.

For the purposes of this application, a tractor trailer consists of a tractor which is the truck portion of the tractor trailer and a trailer which is used to haul cargo. The trailer is unpowered and may be coupled or uncoupled from the tractor.

The tractor is the front portion of a tractor trailer or semi-truck. The tractor consists of a cab which is the portion of the tractor in which the driver sits. The cab may also contain a sleeping area and the like. The tractor has an engine for powering the tractor trailer.

The tractor also has two frame rails which run from the front wheels, under the cab and to the back wheels of the tractor. Frame rails are typically large metal channel beams which support the tractor.

Cross members may be positioned perpendicular to the frame rails in order to add support to the tractor. Cross members are additional beams which are coupled between the two frame rails to add stability to the tractor.

A fifth wheel is located towards the rear of the tractor between the frame rails. The fifth wheel is used to couple the trailer to the tractor.

The trailer also has two frame rails which run parallel to each other under the length of the trailer. Cross members may run perpendicular to the frame rails in order to add additional support to the trailer.

The storage container is located behind the cab of the tractor trailer between the frame rails of either the tractor or the trailer.

A storage container is disclosed for placement between the frame rails of a tractor and/or trailer. The storage container may be opened manually or opened remotely, for example, with the use of actuators. The storage container may have a solid lid or panel cover which is mounted flush so that the storage container is hidden from view.

The storage container may be placed in multiple locations. In one embodiment, the storage container is located on the tractor between the frame rails behind the cab. In another embodiment the storage container is located between the frame rails on a trailer.

FIGS. 1-5 illustrate a storage container 10 located between the frame rails 14 of a tractor behind the cab 12 and in front of the fifth wheel 16. A load 20 is also illustrated in some of the figures to show how the storage container 10 is accessible even if the tractor trailer is carrying a load.

Figure 2:
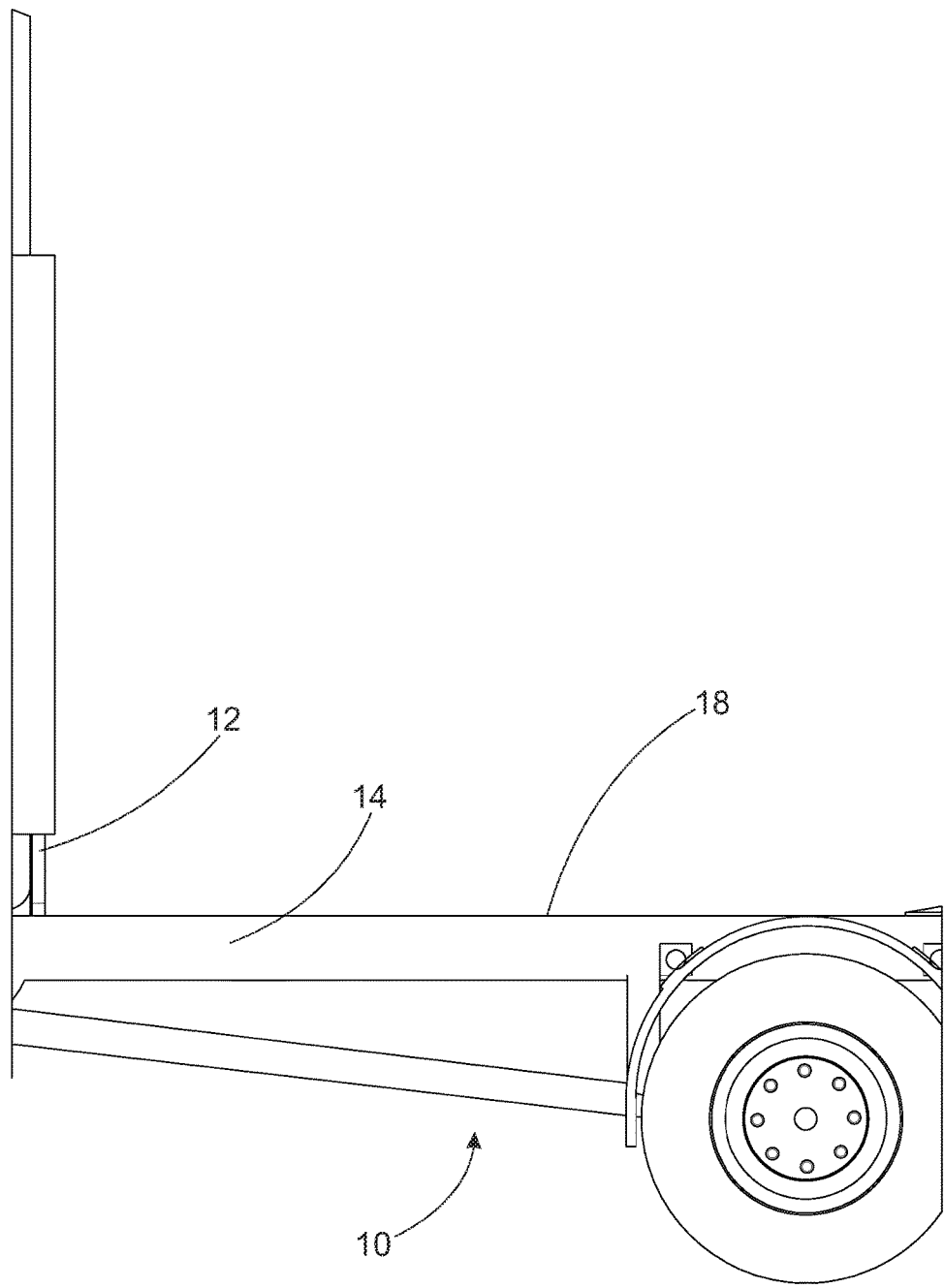
FIG. 2 shows a side view of a tractor having a storage container in a closed position.

FIGS. 1 and 2 illustrate the storage container 10 in a closed position. In the closed position, the storage container 10 is hidden by the cover plate 18. The cover plate 18 is flush with the top of the frame rails 14 when the storage container 10 is in the closed position. As illustrated in the figures, flush includes a top surface of the cover plate 18 being substantially coplanar with the top of the frame rails 14.

FIG. 2 illustrates that, when the storage container 10 is in a closed position or in other words when the cover plate 18 is closed, the storage container 10 is not visible at all from the side of the tractor.

The cover plate 18 is illustrated in the figures as a flat, smooth, rectangular plate. The cover plate 18, however, may be formed in any shape desired. I.e., the cover plate 18 may be formed so as to look like something else in order to camouflage the storage container. The cover plate 18 could be formed to look like it is multiple plates with couplers such as bolts to hold it in place. The cover plate 18 could be formed from diamond plate, aluminum, steel, other metals or metal alloys, composites, polymers, plastics, fiberglass, polycarbonate, wood, glass or the like. The cover plate 18 may be formed in irregular shapes in order to fit around existing accessories or attachments to the tractor trailer.

The cover plate 18 may be formed to look like a deck plate mounted on the frame rails 14 of the tractor. Deck plates are sheets of metal used to cover the frame rails 14 in order to provide a solid surface. Deck plates are very common and therefore having the cover plate 18 resemble a deck plate makes it less likely that someone will discover the storage container 10.

The cover plate 18 may also be painted any color desired in order to blend in with the tractor and better hide the storage container 10.

The cover plate 18 may also have a rubber seal around its edges in order to aid in preventing water from entering the storage container 10.

The cover plate 18 may have rolled edges in order to improve aesthetics and prevent sharp edges.

Figure 3:
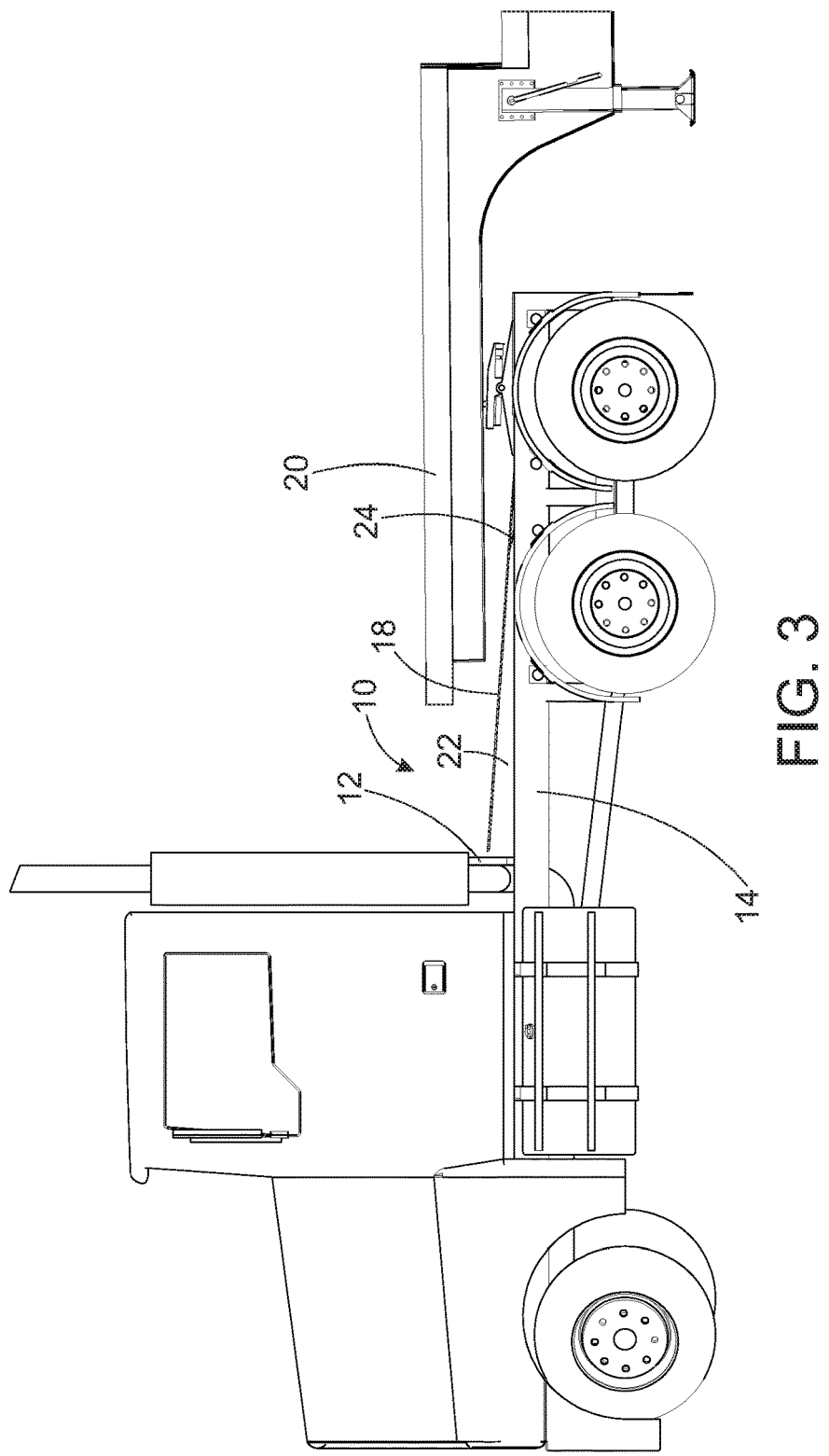
FIG. 3 shows a side view of a tractor trailer, with a load, having a storage container in a partially open position.
Figure 4:
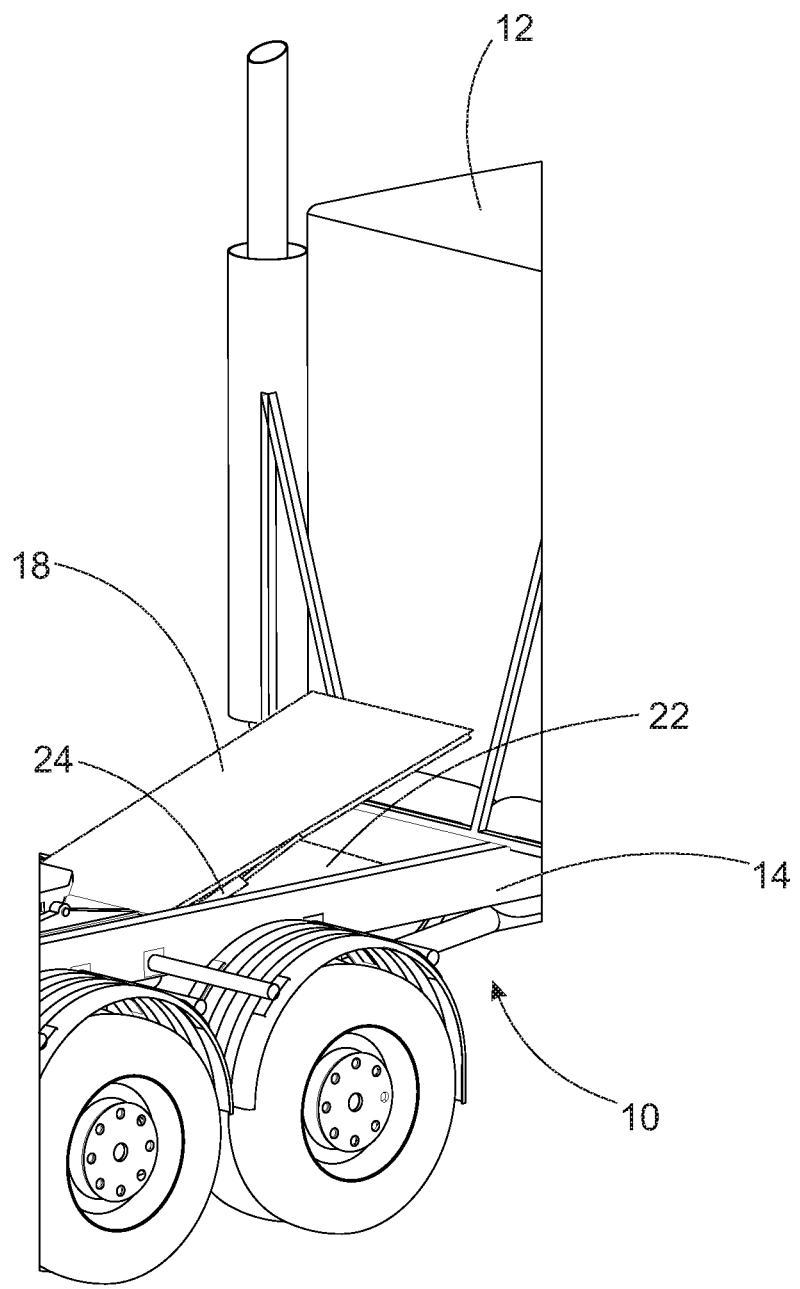
FIG. 4 shows a rear isometric view of a tractor having a storage container in an open position.
Figure 5:
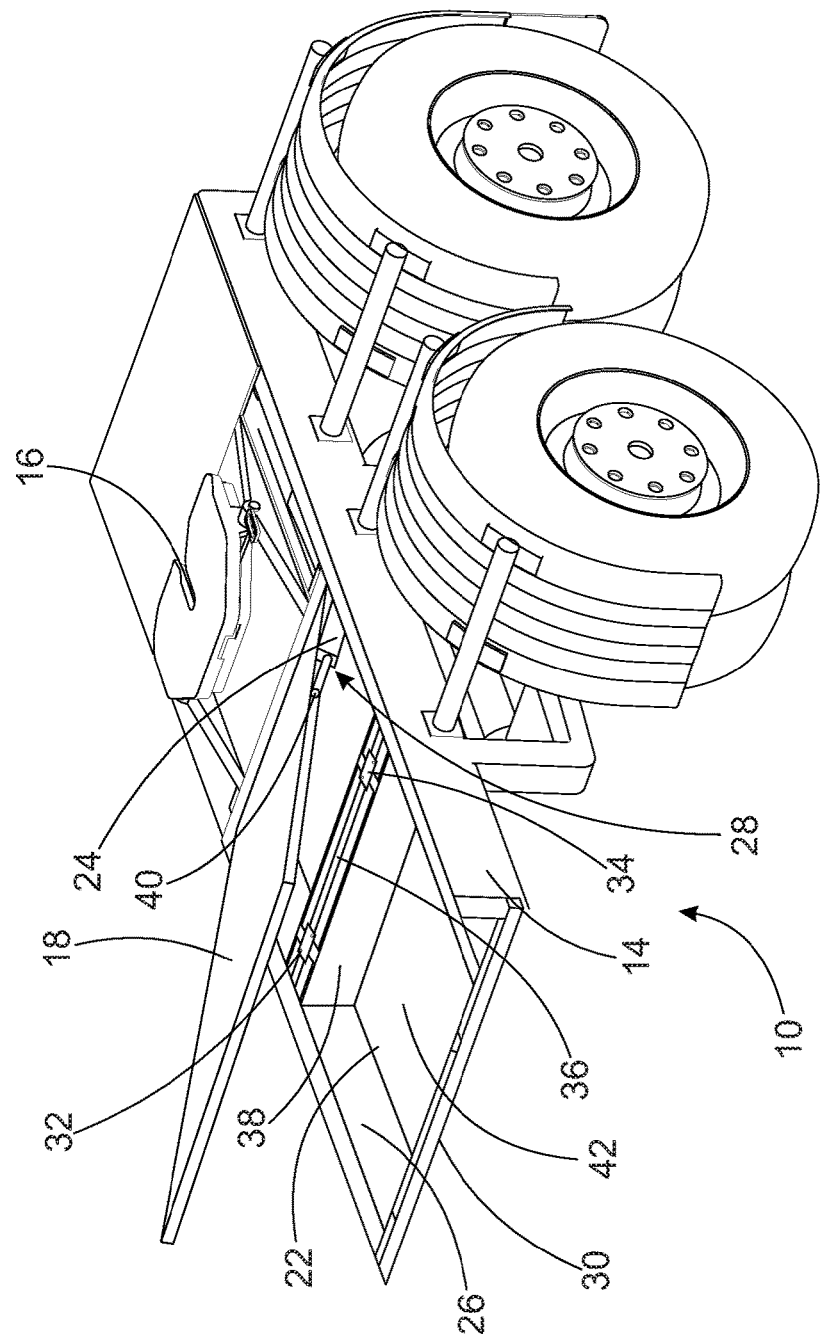
FIG. 5 shows a front isometric view of a tractor platform, with a cab removed, having a storage container in an open position.

FIGS. 3-5 illustrate the storage container 10 in an open position. In these figures, the cover plate 18 has been rotated on hinges 28 in order to allow access to the storage area 22 under the cover plate 18.

Hinges 28 may be located at the end of the storage container nearest the cab 12 of the tractor trailer or farthest away from the cab 12 of the tractor trailer, as illustrated in the figures. Hinges 28 may be any type of hinge that may be mounted on the underside of the cover plate 18 and allow the cover plate 18 to rotate from a flush closed position to an open position. Hinges 28 must be strong enough to support the cover plate 18 through multiple opening and closing iterations.

Hinges 28 are typically located farthest away from the cab 12 of the tractor trailer in order to allow the storage container 10 to be opened even when the tractor has a trailer with an extra long load on it. Having the hinges 28 at the end of the storage container farthest away from the cab 12 allows the lowest portion of the open cover plate 18 to be located under the load 20 and therefore the highest portion of the open cover plate 18 will likely be in a position that is not under the load 20. This allows the interior of the storage container to be accessible even when the tractor trailer is carrying a long load. When the cover plate 18 is open, the open end faces the cab of the tractor.

Hinges 28 are coupled to the cover plate 18 and may also be mounted to a cross beam on the tractor or to a storage area 22 which the cover plate 18 covers.

When the cover plate 18 is in the open position, the user may access the storage area 22 of the storage container 10. The storage area 22 is the open area in which the user may place items.

The storage area 22 is formed by at least two side walls 26 which are parallel to each other. The side walls 26 are also parallel to the tractor's frame rails 14. The side walls 26 may each be a continuous rectangular member that runs the length of the storage container 10 or else the side walls 26 may be formed in multiple sections that are placed along the frame rails 14 between the cross beams 36 on the tractor. The side walls 26 are the sides of the storage area 22. The side walls 26 may be formed in any size or shape desired and may be formed from any material that is strong enough to provide support to the storage container 10.

Separate side walls 26 may not, however, be necessary on every embodiment of the storage container 10. In some instances, the frame rails 14 may be the side walls 26. On most tractors, however, the frame rail is a channel beam and has an open surface turned towards the location for the storage container 10. In these situations, side walls 26 are desirable in order to form a solid storage container 10 and reduce the need to weld to, or alter, the frame rails 14.

At least two end walls 30 are located perpendicular to the frame rails 14 of the tractor. The at least two end walls 30 are located at the ends of the storage container 10. One of the end walls 30 is located at the end of the storage container 10 closest to the cab 12 of the tractor, proximal end, while the other end wall 30 is located at the end of the storage container 10 farthest from the cab 12 of the tractor, distal end.

The end walls 30 are illustrated as shorter rectangular members. The end walls 30, however, may be formed in any size or shape desired. They may also be formed from any material that is strong enough to support the storage container 10.

In alternate embodiments, the tractor's cross members may act as end walls 30.

The hinges 28 may be mounted to one of the end walls 30.

The bottom of the storage container 10 is closed off by a bottom plate 42. The bottom plate 42 is a stationary plate that prevents the items stored in the storage container 10 from falling out. The bottom plate 42 is illustrated as several smaller rectangle or square plates. Additionally, the bottom plate 42 may be one larger rectangular plate.

The bottom plate 42 may be similar in size and shape to the cover plate 18 or the bottom plate 42 may be any size or shape desired, provided the bottom plate 42 prevents the items stored in the storage container from falling out.

The bottom plate 42 may also be formed from any material desired. Materials, which may be used to form the bottom plate 42, include but are not limited to metal, metal alloys, polymers, plastics, composites, glass, wood or the like, provided the material is strong enough to support the items in the storage container 10.

The bottom plate 42 may be one continuous piece or else it may be multiple pieces which fit between the cross members 36 on the tractor.

The bottom plate 42 may also be lined with carpet, rubber or the like in order to protect the contents of the storage area 22 from being damaged during transit.

The storage area 22 of the storage container 10 illustrated in the figures is divided into multiple areas or compartments. However, the storage area 22 may also be one large compartment. The compartments allow different items to be stored in different areas in the storage container 10. Additionally, the compartments allow the storage container 10 to fit around the cross members 36 which are located on the tractor between the frame rails 14.

Compartment walls 38 are located throughout the storage container 10. The compartment walls 38 are placed parallel to and also adjacent to the cross members 36 on the tractor. Each cross member 36 may have one compartment wall 38 on each side of it. The compartment walls 38 may be coupled to both of the side walls 26 to which it is perpendicular. In this way, smaller storage areas 22 may be formed and placed between the cross members 36.

The end walls 30, compartment walls 38, bottom plate 42 and side walls 26 may be coupled to each other with epoxy, welding, adhesive, or the like. Additionally, they may all be formed as one piece.

In alternate embodiments, the end walls 30, compartment walls 38, bottom plate 42 and side walls 26 may not be coupled together, but instead may simply be placed abutting each other.

In other embodiments, the end walls 30, compartment walls 38, and side walls 26 may be replaced by the cross members 36 and frame rails 14 of the tractor trailer.

The individual compartments in the storage area 22 may be completely separate or they may be coupled to each other using straps 34 which are illustrated as rectangular members that are coupled to two storage area 22 compartments. The straps 34 abut the top of the cross member 36 which is between the two storage area 22 compartments.

The straps 34 may be formed in any shape or form desired. They may be rectangular or else they may be square, triangular, oval, trapezoidal or the like. The straps 34 may be formed from strips of metal as illustrated or they may be formed from strap material, chain, rope or the like. One strap 34 may be placed between the storage areas 22 or else multiple straps 34 may be used.

The straps 34 may additionally be coupled to the cross member 36 with couplers 32. The couplers 32 serve to hold the storage areas 22 in place. The couplers 32 also couple the storage container 10 to the tractor trailer. The couplers 32 may be placed in just the straps 34 or the couplers 32 may also be placed through the end walls 30, side walls 26 and compartment walls 38 in order to secure the storage container 10 in place.

The couplers 32 may be any type of coupler desired, such as bolts, screws, rivets, welds or the like.

The cover plate 18 may be opened manually or automatically. Additionally, the cover plate 18 may be rotated open by using a remote, buttons, switches or the like in the cab 12 of the tractor, on the storage container 10, on the frame rails 14, on a key fob or the like.

The cover plate 18 in the figures is automatically opened through use of actuators 24. Actuators 24 are linear actuators. Linear actuators apply force in a straight line. When turned on and allowed to pivot around an end point, the linear actuators 24, push the cover plate 18 in a rotational motion around the hinges 28. Two actuators 24 are shown in the figures, however, one actuator 24 may be used or multiple actuators 24 may be used.

The linear actuators 24, whether pneumatic, hydraulic or electric, are pivotably coupled to the cover plate 18 at actuator pivot 40 which allows the cover plate 18 to rotate with respect to the end of the actuator 24 while the actuator 24 is pushing the cover plate 18 open.

The linear actuators 24 may be electric and may be wired into the electrical system of the tractor. Alternatively, the linear actuators 24 may be coupled to an independent power source such as a battery for operation.

While electric actuators 24 are illustrated, pneumatic linear actuators may also be used. Additionally, rotational actuators such as motors may be used instead of linear actuators.

Pneumatic linear actuators 24 may be used to open the cover plate 18. When pneumatic actuators 24 are used, a supply of compressed air is necessary to force the actuators 24 to extend and thereby open the cover plate 18. Compressed air may be provided by an independent air compressor coupled to the actuators 24 or else the actuators 24 may be coupled to the tractor's compressor.

The actuators 24, whether electric or pneumatic, may be operated by a remote control. This remote may allow the user to lock/unlock and open/close the storage container 10 from a distance away from the tractor trailer. The remote may also have start and stop buttons to allow the cover plate 18 to be opened partially.

The actuators 24 may also be opened remotely by pressing a button, flipping a switch or opening/closing a valve located within the cab 12 or at another location on the tractor trailer.

The storage container 10 may be locked. The storage container 10 may use any type of lock desired, however, it may be desirable to use a lock which may be hidden in order to prevent third parties from discovering the storage container 10. In addition to or alternative to a lock, the storage container 10 may latch shut.

Additionally, the lock may be locked remotely through use of a remote control similar to that used to lock car doors. The lock may also be locked remotely from the use of a switch or button within the cab 12 or at another location on the tractor trailer.

In order to use the storage container 10 described above, the user presses a button or switch on a remote or in another location. The remote triggers the actuator 24 which extends while rotating around the actuator pivot 40, causing the cover plate 18 to rotate around hinges 28.

The user can then place items into the storage area 22.

Once the user is finished placing items into the storage area 22, the user presses another button, switch or the like, or presses the same button again, causing the actuators 24 to retract, allowing the cover plate 18 to close.

After the cover plate 18 is closed, the user can then lock the storage container 10 by remote or manually.

FIGS. 6-9 illustrate an alternate embodiment of the storage container 100. The storage container 100 is located between the frame rails 130 on the underside of a trailer 116. The frame rails 130, like the frame rails on the tractor, are two long beams that run the length of the trailer 116.

Figure 6:
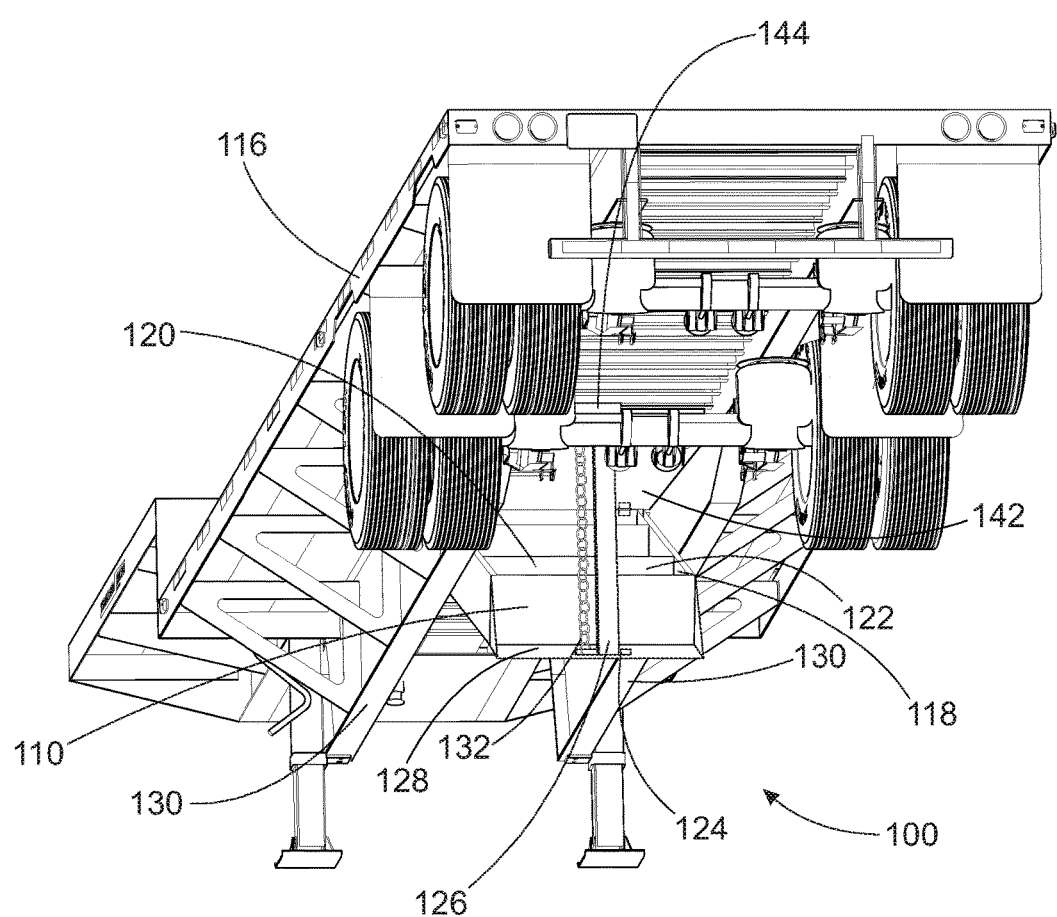
FIG. 6 shows an isometric view of a trailer having a storage container in an open position.
Figure 7:
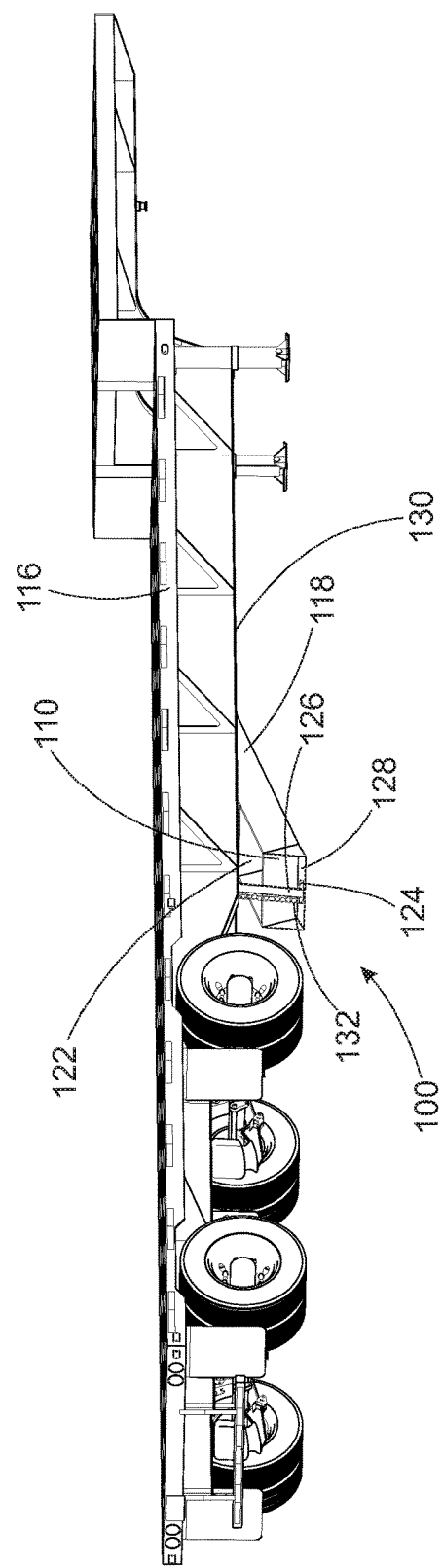
FIG. 7 shows a close up isometric view of a trailer having a storage container in an open position.
Figure 8:
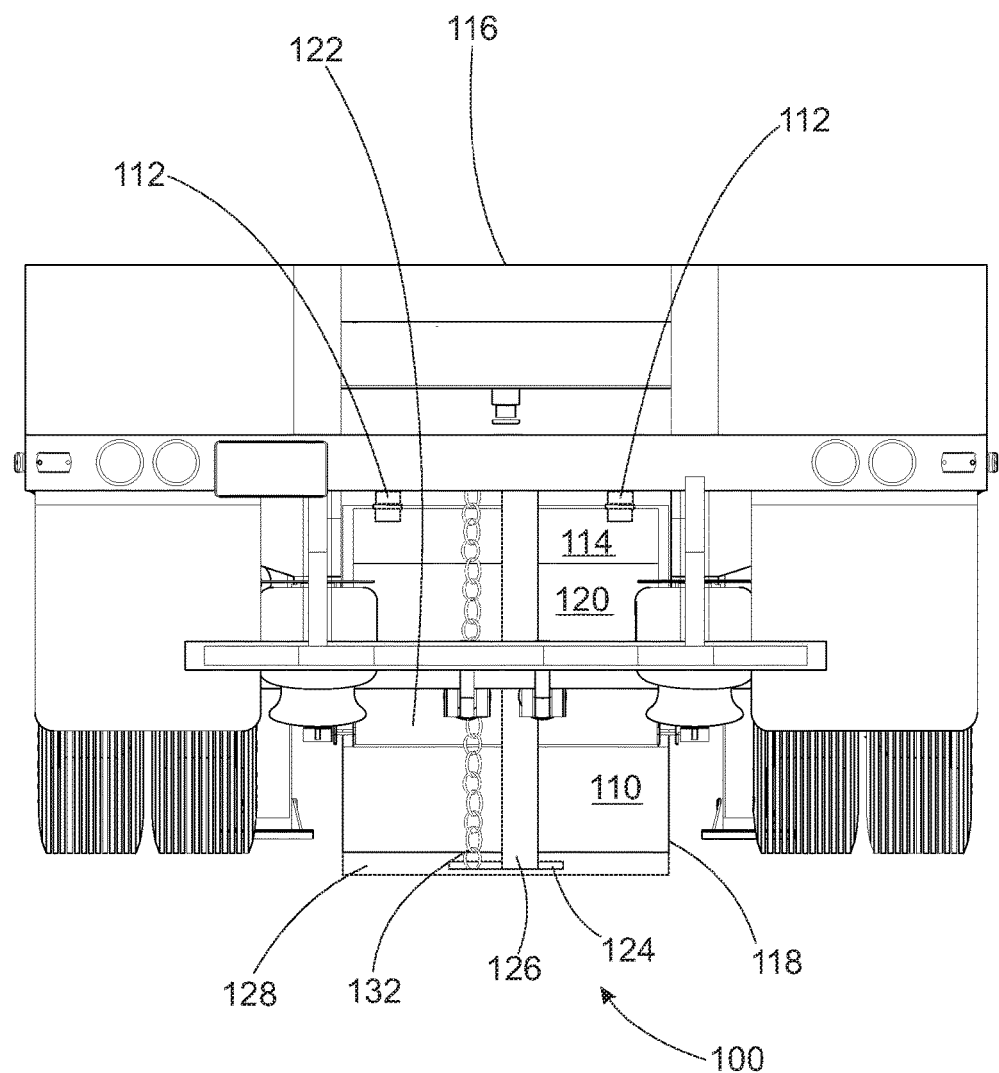
FIG. 8 shows a front view of a trailer having a storage container in an open position.

FIGS. 6-8 illustrate the storage container 100 in an open position. In the open position, the storage container 100 is rotated open so as to allow the user to place items in the storage compartments 122 of the storage container 100.

Figure 9:
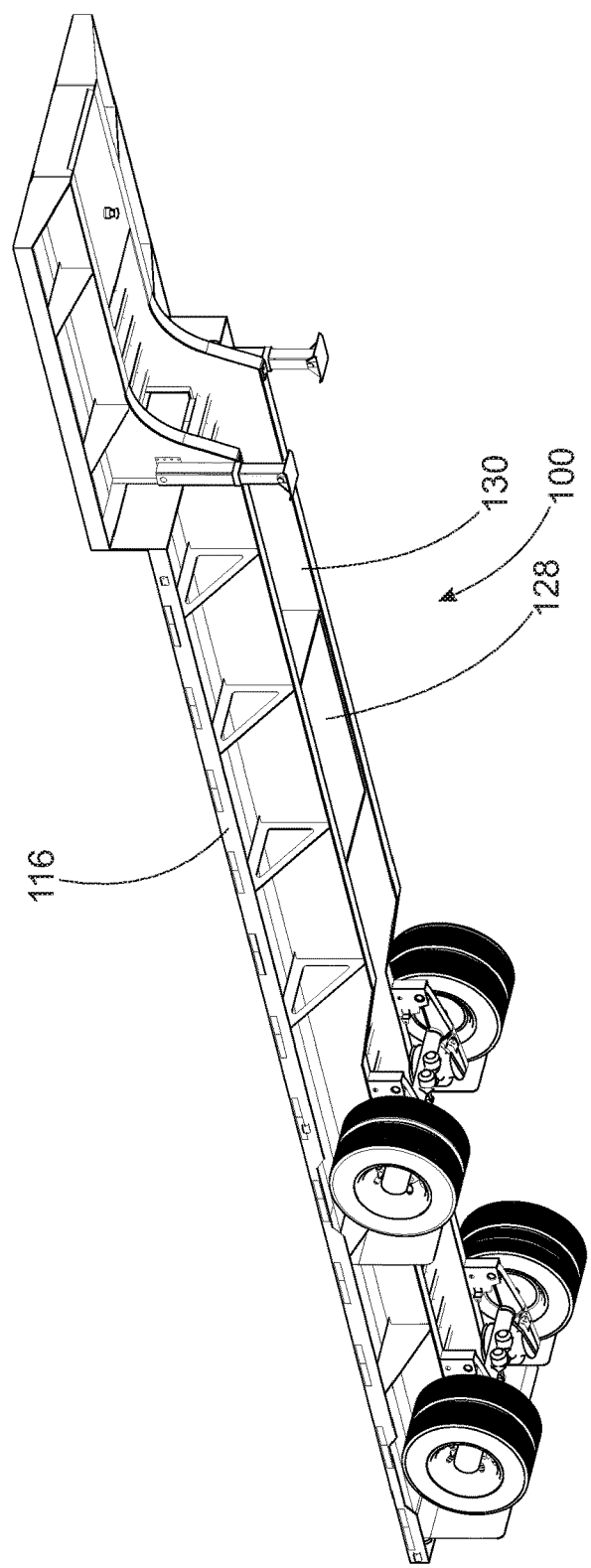
FIG. 9 shows an isometric view of a trailer having a storage container in a closed position.

FIG. 9 illustrates the storage container 100 in a closed position. When the storage container 100 is in the closed position, the cover plate 128 of the storage container 100 is higher or flush with the bottom of the frame rails 130 of the trailer 116. By having the cover plate 128 of the storage container 100 higher than or flush with the bottom of the frame rails 130, the storage container 100 is hidden from the notice of a passerby.

Cover plate 128 is illustrated in the figures as a flat, smooth, rectangular plate. The cover plate 128, however, may be formed in any shape desired. I.e., the cover plate 128 may be formed so as to look like something else in order to camouflage the storage container. The cover plate 128 could be formed to look like it is multiple plates with couplers such as bolts to hold it in place. The cover plate 128 could be formed from diamond plate, aluminum, steel, other metals or metal alloys, composites, polymers, plastics, fiberglass, polycarbonate, wood, glass or the like. The cover plate 128 may be formed in irregular shapes in order to fit around existing accessories or attachments to the tractor trailer.

The cover plate 128 may also be painted any color desired in order to blend in with the trailer and better hide the storage container 100.

As illustrated in FIGS. 6-8, when the storage container 100 is open, it is rotated about hinges 112. Hinges 112 may be located at the end of the storage container 100 nearest the tractor or front of the trailer or farthest away from tractor, as illustrated in the figures. Hinges 112 may be any type of hinge that may be mounted on the top of the storage container 100 and allow cover plate 128 to rotate from a closed position to an open position. Hinges 112 must be strong enough to support the cover plate 128 and the items in the storage container 100 through multiple opening and closing iterations. One hinge 112 may be used or multiple hinges 112 may be desired.

At least one end wall 110 and 114 are coupled to the top of the cover plate 128. Each end wall 110 and 114 is located at a position perpendicular to the length of the cover plate 128 at a ninety degree angle to the surface of the cover plate 128. One end wall 110 is located at the end of the cover plate 128 closest to the tractor, while the other end wall 114 is located at the end of the cover plate 128 farthest from the tractor.

The end walls 110 and 114 are illustrated as shorter rectangular members. The end walls 110 and 114, however, may be formed in any size or shape desired. They may also be formed from any material that is strong enough to support the items contained in storage container 100.

Hinges 112 may be mounted to one of end walls 110, 114 or to cover plate 128.

At least two side walls 118 are located at the edges of the cover plate 128 parallel to the frame rails 130 of the trailer 116. One side wall 118 is located along each of the long edges of the cover plate 128 of the storage container 100. The side walls 118 may each be a continuous rectangular member that runs the length of the storage container 100 or else the side walls 118 may be formed in multiple sections. The side walls 118 are the sides of the storage area compartments 122. The side walls 118 may be formed in any size or shape desired and may be formed from any material that is strong enough to provide support to the items in the storage container 100.

The end walls 110 and 114 and the at least two side walls 118 meet at ninety degree angles at each of the corners of the cover plate 128 thereby forming a box like storage container 100. The end walls 110 and 114, the side walls 118 and the cover plate 128 may be coupled together using glue, adhesive, epoxy, welding, screws, rivets or any other coupling method desired.

The interior of the storage container 100 may be divided into storage area compartments 122 by compartment walls 120. The storage area compartments 122 are the locations in which a user may place items for storage. The compartment walls 120 are rectangular members which are placed across the interior of the storage container 100 in order to make smaller areas so that items can be separated within the storage container 100.

Compartment walls 120 may be rectangular members as illustrated or they may be any shape or size desired. Compartment walls 120 may span the entire width of the storage container 100 or they may only partially span the width. Compartment walls 120 may also be positioned vertically or horizontally within the storage container 100.

Additionally, compartment walls 120 may be formed from any material desired, such as wood, metal, glass, metal alloy, plastic, polymer, composites, engineered materials, or the like. Compartment walls 120 may be coupled in place with screws, bolts, adhesives, epoxy, welding or the like.

A strap rod 124 may also be positioned at the edge of the storage container 100 opposite the hinges 112. The strap rod 124 is a rod coupled parallel to the surface of the cover plate 128 of the storage container 100. The strap rod 124 is used to couple the strap 126 to the cover plate 128 of the storage container 100.

While the strap rod 124 is illustrated as a rod, the strap rod 124 may also be any device which couples the strap 126 to the cover plate 128 of the storage container 100. The strap rod 124 may be a ring, hook, clip or the like.

The strap 126 is illustrated as a heavy duty segment of webbing such as the type used to tow cars or tie down items when they are being transported. The strap 126 is coupled to the strap rod 124 at one end and to an actuator 144 at the other end. The actuator 144 is located on the underside of the trailer 116 and therefore, the strap 126 runs from the bottom of the open storage container 100 to the underside of the trailer 116.

The strap 126 may be formed from any material desired such as chain, rope, or the like. The strap 126 must be formed from a material that is strong and flexible.

One end of the strap 126 is coupled to the strap rod 124, the other end of the strap 126 is coiled around a rotational actuator 144 such as a motor or winch. When the actuator 144 is turned on, the strap 126 is uncoiled and the storage container 100 opens with the cover plate 128 rotating about the hinges 112 which are coupled to the end wall 114 of the storage container 100. The storage container 100 is opened due to gravity pulling the cover plate 128 downward.

When the actuator 144 is turned on in reverse, the strap 126 is coiled back up and the storage container 100 is closed. The storage container 100 is closed due to the strap 126 pulling on the cover plate 128 and pulling it closed.

The storage container 100 moves parallel to the frame rails 130 as it is opening and closing. I.e., the cover plate 128 rotates so that the free end of the cover plate 128 forms an arc along a plane which is parallel to the frame rails 130. This leaves an open end of the storage container 100 pointing towards the front or the back of the trailer 116.

The actuator 144 may be turned on and off remotely by remote control or by buttons, switches, valves or the like located in the cab of the tractor trailer or somewhere on the tractor trailer. The user may have a remote control that allows the user to remotely open/close or remotely lock/unlock the storage container 100 from a distance away from the tractor trailer or the storage container 100 may be remotely locked/unlocked by using a button or switch within the cab or from another location on the tractor trailer. Additionally, the remote, buttons, switches or valves may allow the user to stop the storage container 100 opening completely and thereby allow the user to open the storage container 100 only partially.

The actuator 144 may be wired into the electrical system of the trailer for power, or it may have its own individual power source such as a battery. The actuator 144 may also be pneumatic, hydraulic or the like.

Additional embodiments, may use linear actuators coupled to both the trailer 116 and the storage container 100 in order to open the storage container 100.

In alternate embodiments, the storage container 100 may be opened manually.

The bottom plate 142 of the storage container 100 is coupled to the underside of the trailer 116. The bottom plate 142 as illustrated in the previous embodiment may simply be a flat rectangular panel which seals with the side walls 118 and the end walls 110 and 114 of the storage container 100 in order to protect and contain the items stored in the storage container 100.

The bottom plate 142 may also be formed in any size, shape color or from any material desired.

The bottom plate 142 may also have a rubber seal around its edges in order to aid in preventing water from entering the storage container 100.

The storage container 100 may be locked and/or latched into a closed position. The lock may be hidden in order to prevent passersby from noticing the storage container 100.

The figures also illustrate chain or stop 132. Stop 132 is a length of chain that extends from the bottom plate 142 to the cover plate 128. The stop 132 prevents the cover plate 128 from rotating too far with the storage container 100 is open. The stop 132 could also be formed from webbing, rope or the like.

In order to use the storage container 100 illustrated in FIGS. 6-9, the user would remotely press a button, flip a switch, or opens/closes a valve on a remote or located somewhere on the tractor trailer. The button, switch or valve triggers the actuator 144 which begins to unroll the strap 126. As the strap 126 unrolls, the cover plate 128 rotates about hinges 112 allowing one end of cover plate 128 to lower.

The cover plate 128 rotates until its motion is stopped by stop 132. Stop 132 may be anything that stops the motion of the cover plate 128, however, the figures illustrate stop 132 as a chain that prevents the cover plate 128 from swinging low enough that it spills the contents of the storage area compartments 122.

Once the cover plate 128 is in the open position, the user may place or remove items from the storage area compartments 122.

When the user is finished in the storage area compartments 122, the user presses another button, flips a switch or opens/closes a valve and the actuator 144 begins to turn in the other direction, winding the strap 126 up and pulling the cover plate 128 into the closed position.

Once the cover plate 128 is in the closed position, the user may lock the storage container 100 remotely by using the remote, or flipping a switch located in the cab or somewhere on the tractor trailer or the user may lock the storage container 100 manually.

Figure 10:
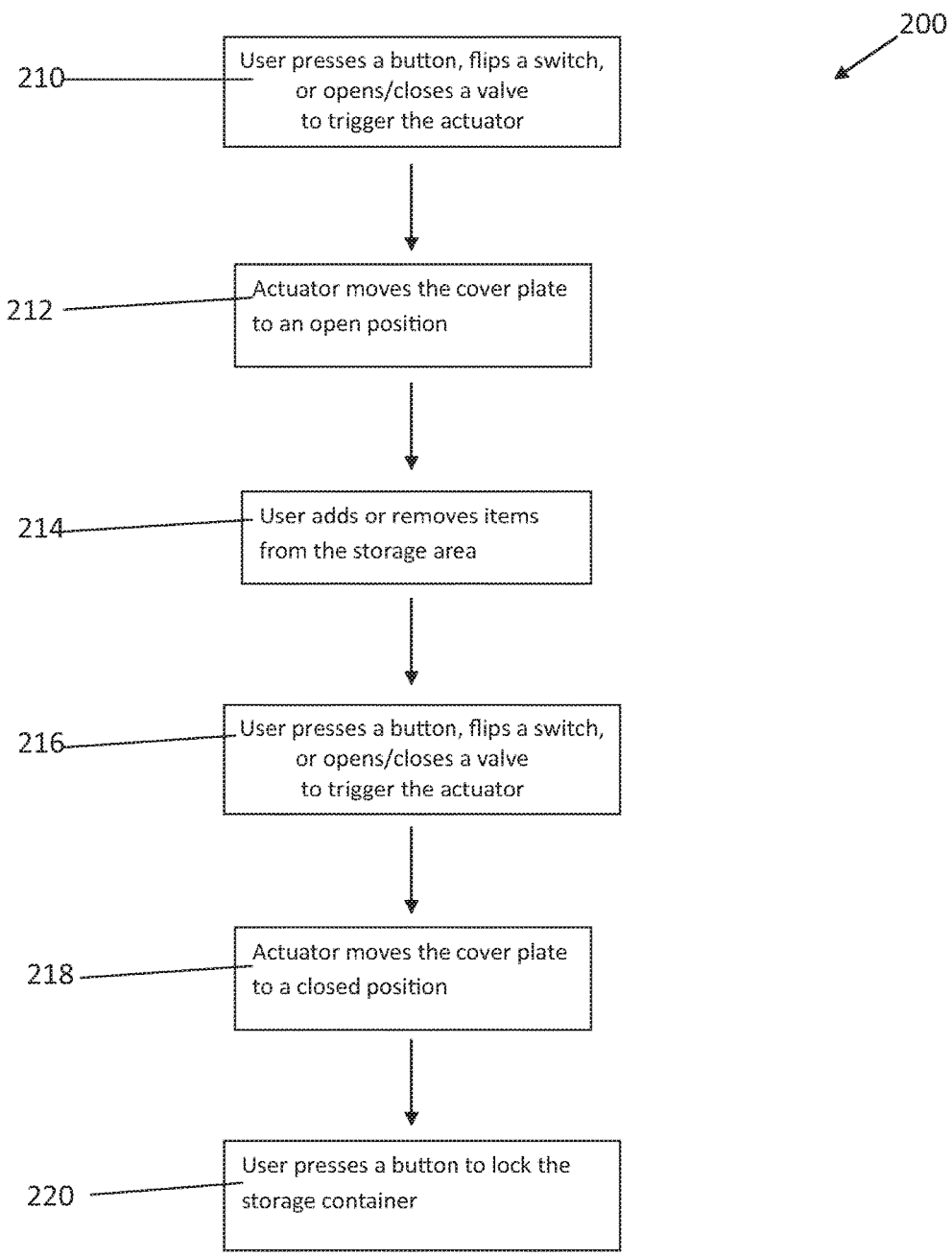
FIG. 10 is a flow chart of a method of using a storage container.

FIG. 10 illustrates a method of using a storage container 200. In order to open the storage container, the user presses a button, flips a switch or opens/closes a valve to remotely trigger the actuator 210. The actuator then moves the cover plate to an open position 212. The actuator moves the cover plate to an open position by either pushing the cover plate open, i.e. a linear actuator pushing the cover plate in an arc parallel to the frame rails, or the actuator rotates unwinding a strap which allows the cover plate to be moved downward by gravity.

The user is now able to add or remove items from the storage area in the storage container 214.

Once the user has finished in the storage area, the user presses a button, flips a switch or opens/closes a valve to remotely trigger the actuator again 216. The actuator then moves the cover plate to a closed position 218. The actuator moves the cover plate to a closed position by either retracting and causing the cover plate to close, or by winding up a strap which pulls the cover plate into a closed position.

After the cover plate is closed, the user may press a button, flip a switch or the like to remotely lock the storage container 220. The storage container is locked by locking the cover plate in place. The button, switch or the like may be located on a remote control, in the cab or anywhere else on the tractor trailer.

Figure 11:
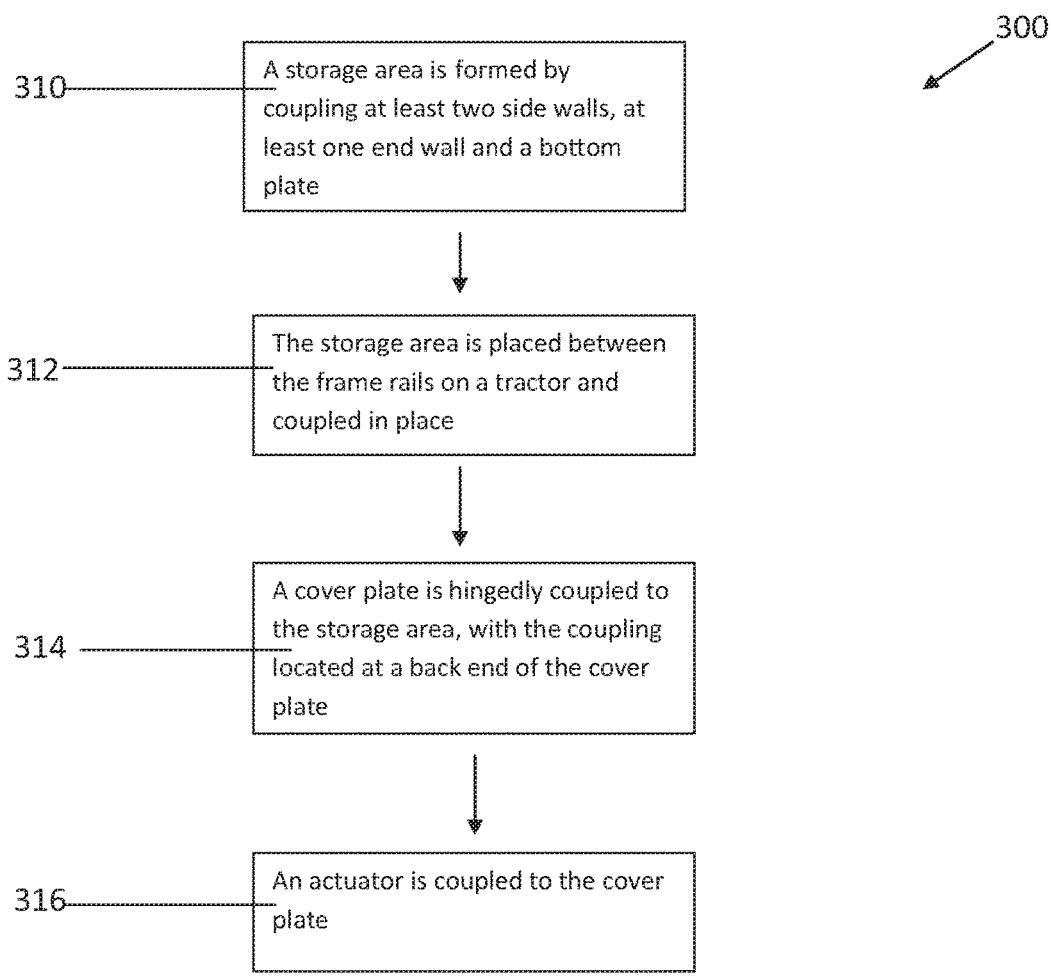
FIG. 11 is a flow chart of a method of manufacturing a storage container for use on a tractor.
Figure 12:
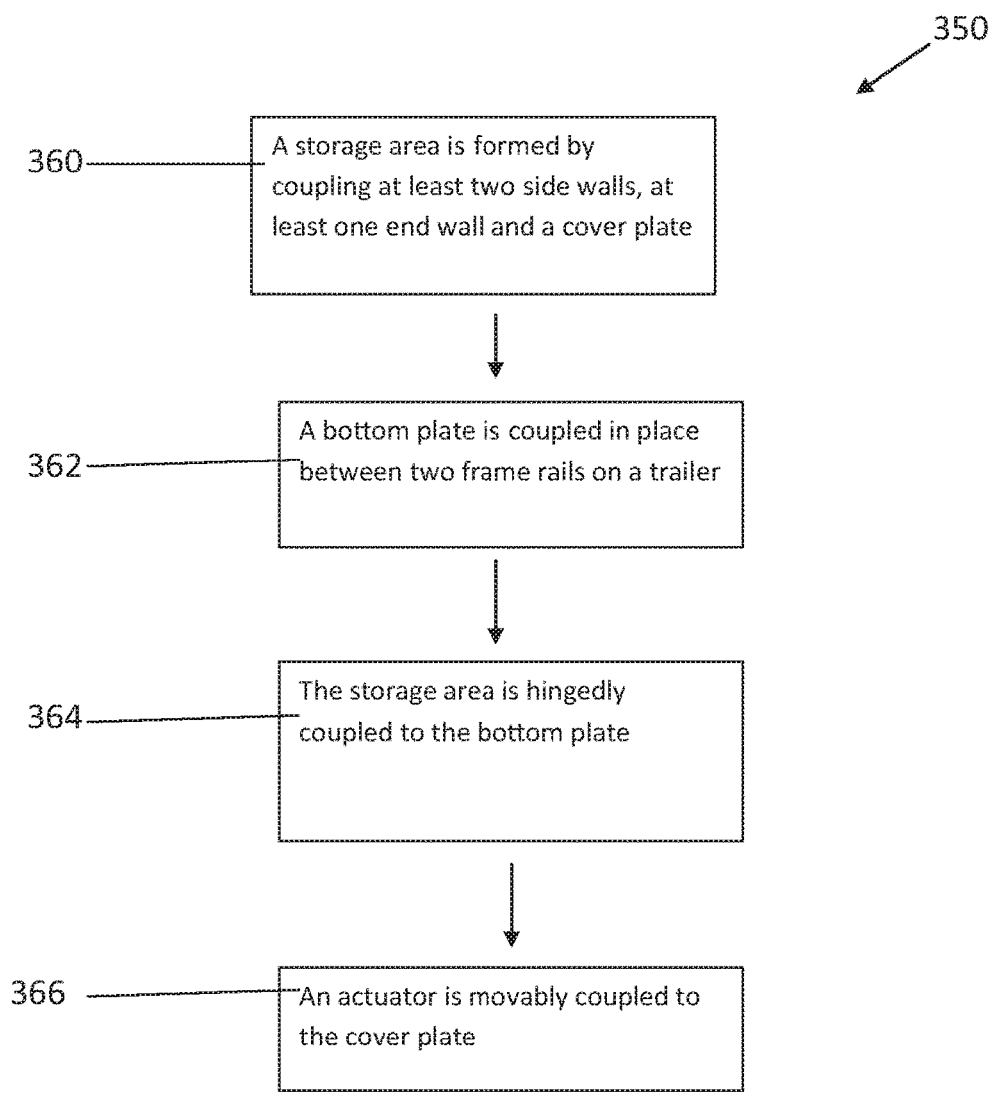
FIG. 12 is a flow chart of a method of manufacturing a storage container for use on a trailer.

FIGS. 11 and 12 illustrate methods of manufacturing storage containers. FIG. 11 specifically illustrates a method for manufacturing a storage container for use on a tractor 300.

First, a storage area is formed by coupling at least two side walls, at least one end wall and a bottom plate together 310. The at least two side walls, at least one end wall and the bottom plate are coupled together perpendicular to each other so that a right angle is formed between each. Multiple storage areas may be formed by using compartment walls. Compartment walls may be used to allow the storage area to fit around cross beams between the frame rails.

Storage areas may be formed with an end wall, two side walls and a compartment wall. Straps are coupled to the compartment wall. A second compartment wall is coupled to a second end of the straps.

The second compartment wall may then be coupled to another two side walls, an end wall or third compartment wall and a bottom plate.

The storage area is then placed between the two frame rails on the tractor and coupled in place 312. If compartment walls and straps were used in forming the storage area, then the compartment walls are placed adjacent a cross beam with the straps going over the top of the cross beam. The straps are coupled to the cross beam.

Once the storage area is in place between the two frame rails, a cover plate is hingedly coupled over the storage area 314. The cover plate is placed so that the top of the cover plate is flush with the top of the two frame rails.

At least one actuator is then coupled to the cover plate 316 in order to allow the cover plate to open and close.

FIG. 12 illustrates a method of manufacturing a storage container for use on the underside of a trailer 350.

First a storage area is formed by coupling at least two side walls, at least one end wall and a cover plate 360. The at least two side walls, at least one end wall and cover plate are coupled together at 90 degree angles so that all of the surfaces are perpendicular to each other and form a box.

Compartment walls may also be coupled in the storage area in order to form smaller storage areas within the storage container.

A bottom plate is positioned between two frame rails on the underside of the trailer and is coupled in place 362.

The storage area is then hingedly coupled to the bottom plate 364.

An actuator is movably coupled to the cover plate 366. The actuator may be directly coupled to the cover plate, i.e. a linear actuator coupled to the cover plate, or the actuator may be coupled to the cover plate through a strap. If the actuator is coupled to the cover plate through a strap, the actuator is coupled to the trailer and rotatably coupled to a strap. The strap is coupled to a strap rod mounted on the storage area. When the actuator is activated, the strap transfers the motion to the cover plate causing the cover plate to open or close.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A storage container for use in combination with a tractor trailer comprising:
   at least two side walls positioned parallel to at least two frame rails of said tractor trailer;
   at least two end walls coupled to said at least two side walls, wherein said at least two end walls are oriented perpendicular to said at least two side walls;
   a bottom plate coupled adjacent said tractor trailer; and
   a cover plate hingedly coupled adjacent said tractor trailer, wherein said storage container is located behind a cab of said tractor trailer and opens parallel to said at least two frame rails, and wherein said cover plate opens remotely with actuators.

2. The storage container for use in combination with a tractor trailer of claim 1, wherein said storage container is positioned between said at least two frame rails.

3. The storage container for use in combination with a tractor trailer of claim 1, wherein said cover plate is flush with said at least two frame rails when in a closed position.

4. The storage container for use in combination with a tractor trailer of claim 1, wherein said storage container is coupled between said at least two frame rails of a tractor of said tractor trailer.

5. The storage container for use in combination with a tractor trailer of claim 4, wherein said cover plate opens upwards.

6. The storage container for use in combination with a tractor trailer of claim 1, wherein said cover plate is hingedly coupled adjacent said tractor trailer at a back end of said cover plate, said back end of said cover plate being farther away from said cab, a front end of said cover plate being closer to said cab.

7. The storage container for use in combination with a tractor trailer of claim 1, wherein said storage container is coupled underneath a trailer of said tractor trailer.

8. The storage container for use in combination with a tractor trailer of claim 7, wherein said cover plate, said at least two side walls and said at least two end walls rotate downward when said storage container is opened.

9. The storage container for use in combination with a tractor trailer of claim 8, wherein said storage container opens remotely with actuators.

10. A storage container for use in combination with a tractor trailer comprising:
    at least two end walls which are oriented perpendicular to at least two frame rails of a tractor of said tractor trailer;
    a bottom plate coupled to said at least two end walls, wherein said bottom plate is perpendicular to said at least two end walls;
    a cover plate hingedly coupled parallel to said bottom plate, wherein said cover plate is positioned flush with a top of said at least two frame rails;
    wherein said storage container is positioned between said at least two frame rails; and
    wherein said cover plate opens upward; and
    at least one actuator for opening said storage container.

11. The storage container for use in combination with a tractor trailer of claim 10, wherein said storage container is accessible from the top.

12. The storage container for use in combination with a tractor trailer of claim 10, wherein said cover plate appears to be a platform mounted between said frame rails.

13. The storage container for use in combination with a tractor trailer of claim 10, wherein said cover plate is hingedly coupled at a back end of said cover plate, said back end of said cover plate being farther away from said tractor, a front end of said cover plate being close to said tractor.

14. The storage container for use in combination with a tractor trailer of claim 10, further comprising a hidden lock.

15. A method for using a storage container in combination with a tractor trailer comprising:
   remotely activating an actuator coupled to a cover plate, wherein said actuator causes said cover plate to rotate in an arc parallel to at least one frame rail on said tractor trailer from a closed position to an open position;
   adding or removing items from a storage area accessible when said cover plate is in said open position;
   remotely activating said actuator, wherein said actuator causes said cover plate to rotate from said open position to said closed position; and
   remotely locking said storage container.

16. The method for using a storage container in combination with a tractor trailer of claim 15, wherein said actuator is a linear actuator for pushing said cover plate to said open position.

17. The method for using a storage container in combination with a tractor trailer of claim 15, wherein said actuator is a winch for reeling a strap in to pull said cover plate from said open position to said closed position.

* * * * *